S. RODGERS.
Tubular Needle for Embalming.
No. 207,551.  Patented Aug. 27, 1878.
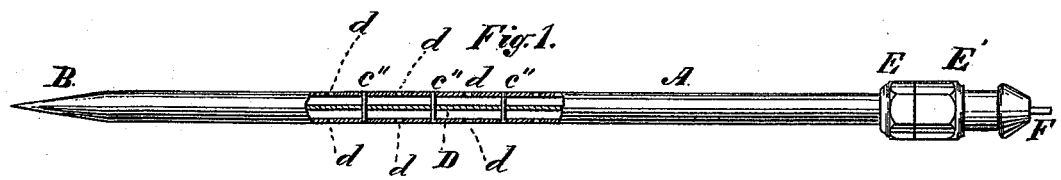
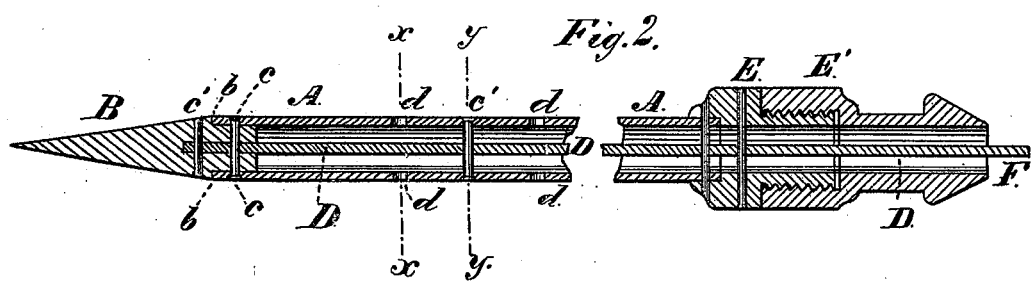
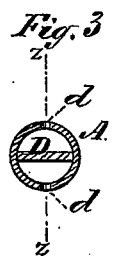 
Witnesses:
S. Allen
Vernon H. Harris
Inventor:
Samuel Rodgers
By Brown & Allen
Attys

UNITED STATES PATENT OFFICE.

SAMUEL RODGERS, OF LOS ANGELES, CALIFORNIA.

IMPROVEMENT IN TUBULAR NEEDLES FOR EMBALMING.

Specification forming part of Letters Patent No. 207,551, dated August 27, 1878; application filed January 8, 1878.

*To all whom it may concern:*

Be it known that I, SAMUEL RODGERS, of Los Angeles, in the county of Los Angeles and State of California, have invented a new and useful Improvement in Tubular Needles for Embalming, Surgical, and Anatomical Purposes; and I do hereby declare that the following is a full, clear, and exact description of the same, reference being had to the accompanying drawing, forming part of this specification.

My invention consists in a tubular needle having a perforated wall and a solid point from which a rigid bar extends longitudinally outward through the end of said needle, projecting beyond the end far enough to be conveniently struck endwise by a mallet for driving the needle through cartilage and bones, said bar being braced by transverse pins passing through it and diametrically through the said needle; and, further, in the combination, with such a needle, having its end screw-threaded, of a suitable correspondingly-threaded hose-coupling, by means of which may be attached a hose for conveying to or from the needle the liquid to be injected or withdrawn.

Figure 1 in the drawing is a side view of the needle with a portion broken away from one side thereof. Fig. 2 is an enlarged central longitudinal section of the same, made on the line $z\,z$ in Fig. 3. Figs. 3 and 4 are cross-sections made respectively on the lines $x\,x$ and $y\,y$ in Fig. 2.

A is the tubular body or shaft of the needle, and B is the solid point of the same, made preferably of steel. Said point has preferably formed thereon a shoulder, $b$, against which the tube A abuts. Said tube is attached to said point by a cross-pin, $c$, inserted through both said tube and said point, and is also attached by brazing; but said attachment may be made by a male and female screw or by any other appropriate method, a detachable point being no part of my invention. In the sides of the needle A are formed holes $d$ for the passage of liquid through said sides.

D is a bar, preferably of steel and preferably flat, but which may be round, square, or of any other cross-section. Said bar D extends centrically through the tube A, and is attached to the point B in any suitable manner; but I, at present, prefer to attach the said bar to said point by letting the end of said bar into a recess or mortise in said point, then inserting the pins $c\,c'$ through said point and bar, and finally brazing said bar and point together. When said bar D is flat, as shown in the drawing, I employ cross-pins $c''$ for strengthening and supporting said bar and tube in mutual relation with each other. Said pins are inserted through the said bar and tube, and riveted or otherwise secured in their positions.

E E' is a screw-coupling for the attachment of a rubber hose or other suitable flexible tube to the needle. Said coupling or the part E of the same is preferably attached to the tube A by cross-pins and brazing, but it may be otherwise attached. Protruding through the said coupling, or at least the part E of the same, is an extension, F, of the strengthening-bar D, upon which blows are struck with a soft hammer or mallet, for forcing the needle through resistant tissues.

The use of the needle will be sufficiently exemplified by a description of its use in injecting the brain with a preservative liquid. For this purpose the needle is inserted in the nostril and forced upward till the point reaches the ethmoid bone. Then one or more blows on the extension F of the bar D forces the point B through the said bone into a lobe of the brain. The preserving-liquid being then forced into the needle, said liquid passes through the holes $d$ in the sides of the needle into the brain tissue, until the required amount has been injected.

I am aware that well-tubes have been constructed with solid points from which extend outwardly rigid bars or inner tubes, by which the point may be driven as the point of my needle is driven, and I do not wish to cover this idea, broadly, by my patent.

I claim—

1. A tubular needle having a perforated wall and a solid point from which a rigid bar extends longitudinally through and beyond the end of said needle, and is braced by transverse pins extending diametrically through the wall of said needle and the bar at intervals, substantially as and for the purpose set forth.

2. The combination, with a tubular needle having the central solid bar and rigid point, of the coupling E E' for the attachmen[t of] the flexible tube, substantially as and for t[he] purpose set forth.

SAMUEL RODGERS.

Witnesses:
VERNON H. HARRIS,
L. ALLEN.